(12) United States Patent
Hammoud

(10) Patent No.: US 11,008,938 B2
(45) Date of Patent: *May 18, 2021

(54) GAS TURBINE BLOWER/PUMP

(71) Applicant: Greentech Gas Turbine Inc./ Turbine A Gaz Greentech Inc., Blainville (CA)

(72) Inventor: Omar Hammoud, Lorraine (CA)

(73) Assignee: APGN INC., Blainville (CA)

(*) Notice: Subject to any disclaimer, the term of this patent is extended or adjusted under 35 U.S.C. 154(b) by 235 days.

This patent is subject to a terminal disclaimer.

(21) Appl. No.: 16/131,850

(22) Filed: Sep. 14, 2018

(65) Prior Publication Data

US 2019/0153938 A1  May 23, 2019

Related U.S. Application Data

(63) Continuation-in-part of application No. 15/044,316, filed on Feb. 16, 2016.

(30) Foreign Application Priority Data

Feb. 16, 2016 (WO) ................ PCT/CA2016/000043

(51) Int. Cl.
*F02C 1/08* (2006.01)
*F02C 3/06* (2006.01)
(Continued)

(52) U.S. Cl.
CPC ................ *F02C 1/08* (2013.01); *F01D 13/02* (2013.01); *F01D 15/005* (2013.01); *F01D 15/08* (2013.01); *F01D 15/10* (2013.01); *F02C 3/064* (2013.01); *F02C 3/10* (2013.01); *F02C 3/107* (2013.01); *F02C 3/22* (2013.01); *F02C 3/34* (2013.01);
(Continued)

(58) Field of Classification Search
CPC .... F04D 25/02; F02C 6/18; F02C 7/36; F02C 3/10; F02C 3/103; F02C 6/10; F02C 7/08; F02C 7/10
See application file for complete search history.

(56) References Cited

U.S. PATENT DOCUMENTS 4,178,761 A * 12/1979 Schwartzman ......... F01K 25/10
60/648
4,313,301 A  2/1982 Belke et al.
(Continued)

FOREIGN PATENT DOCUMENTS

EP          0891482      7/2003
WO          9738218      10/1997
WO          2012032557   3/2012

OTHER PUBLICATIONS

PCT International Search Report arid Written Opinion dated Oct. 18, 2016 for PCT/CA2016/000043 filed Feb. 18, 2016.
(Continued)

*Primary Examiner* — Craig Kim
(74) *Attorney, Agent, or Firm* — Eugene J. A. Gierczak; Miller Thomson LLP

(57) ABSTRACT

A low emission, high efficiency Gas Turbine engine operating on a combination of Natural Gas and Bio Gas as fuel, driving either a high efficiency turbo-blower or a high efficiency Turbo Pump system combined with heat recovery systems and in other embodiments is provided a generator of electricity or providing evaporate cooling from using the remaining waste heat in the exhaust gas.

19 Claims, 15 Drawing Sheets

(51) Int. Cl.

| | | |
|---|---|---|
| *F02C 3/22* | (2006.01) | |
| *F02C 3/34* | (2006.01) | |
| *F02C 7/10* | (2006.01) | |
| *F02C 3/107* | (2006.01) | |
| *F02C 7/18* | (2006.01) | |
| *F01D 13/02* | (2006.01) | |
| *F02C 7/143* | (2006.01) | |
| *F02C 6/18* | (2006.01) | |
| *F01D 15/08* | (2006.01) | |
| *F01D 15/10* | (2006.01) | |
| *F01D 15/00* | (2006.01) | |
| *F02C 3/10* | (2006.01) | |

(52) U.S. Cl.
CPC ................. *F02C 6/18* (2013.01); *F02C 7/10* (2013.01); *F02C 7/143* (2013.01); *F02C 7/185* (2013.01); *F05D 2210/12* (2013.01); *F05D 2220/62* (2013.01); *F05D 2260/211* (2013.01); *F05D 2260/213* (2013.01); *F05D 2260/232* (2013.01)

(56) References Cited

U.S. PATENT DOCUMENTS

| | | |
|---|---|---|
| 4,813,228 A | 3/1989 | Hueller |
| 5,119,624 A | 6/1992 | McKenna |
| 6,269,625 B1 | 8/2001 | Dibble et al. |
| 6,363,706 B1 | 4/2002 | Meister et al. |
| 7,146,813 B2 | 12/2006 | Brasz et al. |
| 8,096,127 B2 | 1/2012 | Ono et al. |
| 8,240,976 B1 | 8/2012 | Kamio |
| 8,327,644 B2 | 12/2012 | Gordon |
| 8,506,237 B2 | 8/2013 | Japikse et al. |
| 8,813,497 B2 | 8/2014 | Hart et al. |
| 8,931,291 B2 | 1/2015 | Czechowski |
| 9,140,267 B2 | 9/2015 | Sharp |
| 9,777,629 B2 | 10/2017 | Nakamoto et al. |
| 2010/0186418 A1 | 7/2010 | Beutin et al. |
| 2010/0219779 A1 | 9/2010 | Bradbrook |
| 2010/0293967 A1* | 11/2010 | Liskow ............ F02C 3/103 62/6 |
| 2012/0102911 A1 | 5/2012 | Dewis et al. |
| 2013/0139519 A1* | 6/2013 | Kesseli ............ F02C 7/275 60/773 |
| 2014/0090376 A1 | 4/2014 | Burrato |
| 2014/0123624 A1* | 5/2014 | Minto ............ F02C 1/005 60/39.281 |
| 2014/0373551 A1 | 12/2014 | Kraft et al. |
| 2016/0105078 A1 | 4/2016 | Santini et al. |

OTHER PUBLICATIONS

European Search Report and Annex dated Sep. 2, 2019 for EP 168901363.
U.S. Office Action dated Oct. 4, 2019 in U.S. Appl. No. 15/044,316.
U.S. Office Action dated Mar. 27, 2019 in U.S. Appl. No. 15/044,316.
U.S. Office Action dated Dec. 13, 2017 in U.S. Appl. No. 15/044,316.

* cited by examiner

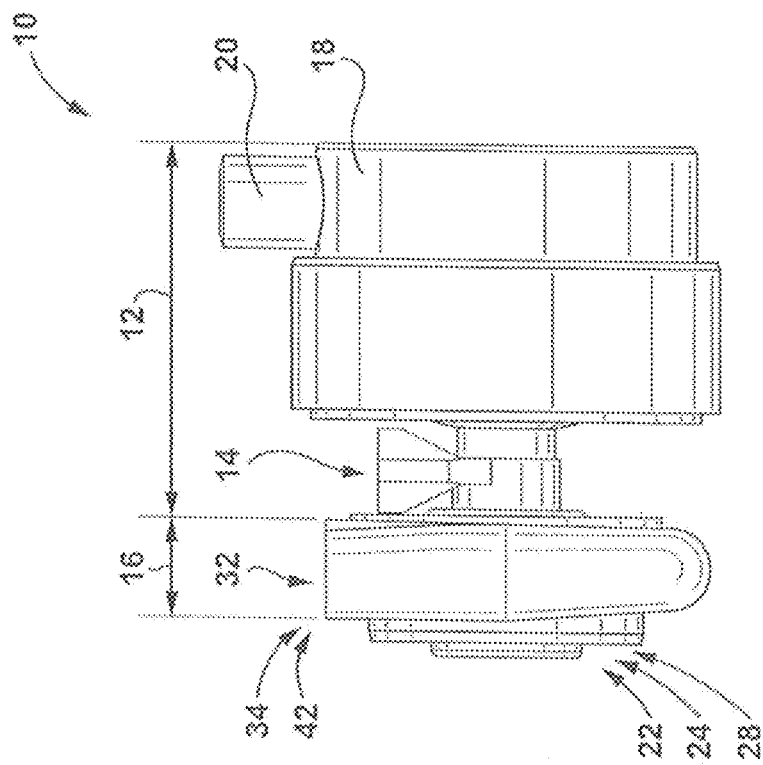
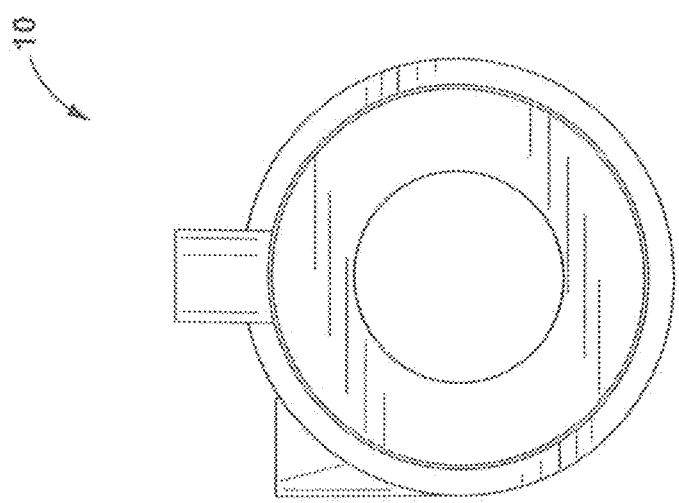

Operating Cost - Gas Turbine Blower/Pump

| State/Province | Florida | Texas | California | Ontario (Canada) | |
|---|---|---|---|---|---|
| Blower impeller input power | 636,500 | 636,500 | 636,500 | 636,500 | btu/hr |
| Blower impeller input power | 187 | 187 | 187 | 187 | kW |
| Gas Turbine input power (HHV) | 1,742,854 | 1,742,854 | 1,742,854 | 1,742,854 | btu/hr |
| Natural Gas Fuel Cost (HHV) | 0.67 | 0.55 | 0.98 | 0.71 | $/therm HHV |
| Operating Cost | $11.68 | $9.59 | $17.08 | $12.42 | $/hr |
| Operating Cost | $102,292 | $83,971 | $149,621 | $108,765 | $/yr |

Operating Cost - Electric Motor Blower/Pump

| State/Province | Florida | Texas | California | Ontario (Canada) | |
|---|---|---|---|---|---|
| Blower impeller input power | 636,500 | 636,500 | 636,500 | 636,500 | btu/hr |
| Blower impeller input power | 187 | 187 | 187 | 187 | kW |
| Blower system Electric Loss | 12% | 12% | 12% | 12% | % |
| Blower wire power input from Electric Grid | 212 | 212 | 212 | 212 | kW |
| Electric Power Cost from Electric Grid | 0.08 | 0.08 | 0.12 | 0.10 | $/kW-hr |
| Operating Cost | 17 | 16 | 25 | 21 | $/hr |
| Operating Cost | 148,773 | 139,475 | 223,160 | 185,967 | $/yr |
| Operating Cost Savings Gas vs Electric, $ | $46,482 | $55,504 | $73,539 | $77,202 | $/yr |
| Operating Cost Savings Gas vs Electric, % | 31% | 40% | 33% | 42% | |

GAS TURBINE BLOWER/PUMP

FIELD OF INVENTION

This invention relates to Aeration Blowers and Pump technologies. More particular, the present invention relates to a Gas Turbine engine fueled by Natural gas or Bio gas, the byproduct of wastewater treatment, where this Gas turbine engine direct drives a blower or a pump, employing a recuperated heat in the Gas Turbine to increase the Gas Turbine Inlet temperature to 1800 to 2000 Deg F. and a heat exchanger cooling system or a electric generator system driven by the downstream system exhaust waste heat.

It is an aspect of this invention to combine in the same design the direct mechanical power from the Gas Turbine fueled by Natural gas and Bio gas to the impeller of a blower or a pump with heat recovery from the exhaust gas; all in one highly efficient system.

BACKGROUND

Blowers and Pumps are used in a variety of applications including water and wastewater treatment, food and beverage, oil and gas, power generation, pulp and paper and pharmaceutical industries. Such blowers deliver airflow at nigh volume and pressure typically lower than 1.0 atmospheres of discharge pressure. The pumps deliver low or high water flow at varying heads, in the past blowers and pumps have been driven by electric motors. Electric motors require electricity generated on site using a variety of electric co-generators or accessing this electricity from the electric grid. Electric-motor driven blowers and pumps; require several complex electric components, including variable frequency drives, Sine wave fitters, Line Input Reactors, Harmonic Filters and power Transformers. These electric components produce electric losses and waste heat leading to an estimated 12 to 15% energy loss.

In some occasions, reciprocating gas or diesel engines drive the blowers and pumps. These reciprocating engines are inefficient, noisy, and large in size, produce a large amount of waste heat and are difficult to retrofit them to meet the evolving emission standards. On the other hand, Gas Turbines have evolved over the years to being highly efficient, low in emissions as they are used in a variety of applications from aerospace, aviation and power generation. In some cases, Gas Turbine engines are used to drive high-pressure gas compressors that deliver natural gas, oxygen or nitrogen in pipelines, at multiple atmospheres discharge pressures. During the compression of gas, gas turbine exhaust beat and the compression heat energies are generated as byproducts and expelled as waste heat.

Thus, the wasted energy in the use of electric motors and the wasted energy in the use of reciprocating engines or Gas Turbine engines combined with the wasted energy by product of compression represent significant energy loss in the operation of compressors, blowers and pumps. Furthermore, biogas is a free byproduct of waste treatment, when treated properly, instead of being flared or dumped to the atmosphere, can be used alone or in a combination with natural gas to produce the fuel required for the gas turbine engine directly driving the blower or pump thereby reducing significantly the operating costs of the waste treatment facility. Recently, we started to see an emerging global trend to use the biogas as fuel to help wastewater treatment facilities achieve their goal of becoming energy neutral.

Various reciprocating engines or Gas Turbine Engines have heretofore been made in the prior art.

For example U.S. Pat. No. 9,140,267 discloses a compressor housing that defines a gas inlet flow path and a gas outlet and a rotatable impeller wheel between the gas inlet flow path and the gas outlet. An inner wall of the housing defines a surface in close proximity to radially outer edges of impeller wheel vanes that sweep across the surface as the wheel rotates. An opening is provided in the inner wall at the surface. A port is provided in the housing in gas communication with the opening for diverting gas in a direction away from the inlet flow path during relatively low flow conditions. A gas displacement device is disposed outside of the inlet flow path and connected to the port, wherein the pump is operable to remove gas selectively through the opening and the port in a direction away from the inlet flow path.

Another arrangement is disclosed in U.S. Pat. No. 8,506,237 which relates to a turbomachine that includes a radial-flow impeller and one or more of a variety of features that enhance the performance of machinery in which the turbomachine is used. For example, when the turbomachine is used in a dynamometer where one of the features is a variable-restriction intake that allows for adjusting, flow rate to the impeller. An impeller shroud and a shroud guide each movable relative to impeller. An exhaust diffuser facilitates an increase in the range of shaft power and the reduction of deleterious vibration and noise. The turbomachine can also include a unique impeller blade configuration that cooperates with the adjustable intake and the exhaust diffuser to enhance flow through the turbomachine.

U.S. Pat. No. 8,327,644 illustrates a micro gas turbine engine for use in a turbo heater or co-generation application is described. The micro gas turbine engine includes a fuel delivery system which minimizes the development of deposits in the air-fuel passageway. To this end, a fuel delivery channel formed between a fuel deflector and a stinger body is formed with a contoured or undulating surface. A fuel deflector ring is interposed between the fuel delivery channel and the slinger impeller to facilitate the flow of the air-fuel mixture into the combustion chamber.

Yet another centrifugal pump is shown in U.S. Pat. No. 8,240,976 which relates to a centrifugal pump housing including a rata table impeller having radial blades and an axial diffuser having vanes angularly spaced downstream of said impeller by a cross-over gap formed within said pump housing so that the fluid subjected to the impeller must move through said cross-over gap to be driven into said axial diffuser, the improvement comprising at least a single, axial diffuser vane extension mounted circumferentially with said axial diffuser and extending into said cross-over gap for guiding the fluid flow from said impeller through the cross-over gap and driven to said axial diffuser, said diffuser vane extension being constructed designed and formed in structure with a tandem vane portion for imparting a twisting force to the fluid received from said impeller for minimizing any turbulence present in the fluid stream as it leaves the impeller whereby said pump exhibits a pump head curve that has been modified for eliminating flat or positive slopes as the flow-head curve becomes continuously rising toward shut-off.

U.S. Pat. No. 8,096,127 describes an exhaust turbo-supercharger is capable of preventing misalignment of the center of the rotating shaft of a supercharger turbine and the center of the rotating shaft of a supercharger compressor, or, misalignment of the center of the rotating shaft of the supercharger turbine, the center of the rotating shaft of the supercharger compressor, and the center of the rotating shaft of a power generator, due to the heat of exhaust gas; is capable of reducing vibration of these rotation axes; and is capable of improving the reliability of the entire supercharger. The exhaust turbo-supercharger has a casing that supports a turbine unit and a compressor unit. The lower end of the casing constitutes a leg portion, and the leg portion is fixed to a base placed on the floor. A power generator having a rotating shaft is connected to a rotating shaft of the turbine unit and the compressor unit.

Moreover U.S. Pat. No. 8,931,291 illustrates a system that includes a gas compressor including an engine, a compressor driven by the engine, and a vapor absorption cycle (VAC) system driven by waste heat from the compressor, wherein the VAC system is configured to cool at least one medium. In other embodiments is provided a method: that includes generating waste heat white compressing a gas, driving a vapor absorption cycle (VAC) system with the waste heat, and cooling at least one medium via the VAC system.

Finally U.S. Pat. No. 746,813 relates to a centrifugal compressor is applied as an organic rankine cycle turbine by operating the machine in reverse. In order to accommodate the higher pressures when operating as a turbine, a suitable refrigerant is chosen such that the pressures and temperatures are maintained within established limits. Such an adaptation of existing, relatively inexpensive equipment to an application that may be otherwise uneconomical, allows for the convenient and economical use of energy that would be otherwise lost by waste heat to the atmosphere.

It is an object of this invention to provide an improved gas turbine engine and in particular to provide an improved aeration blower and pump.

It is an aspect of this invention to combine in the same design the direct mechanical power from the Gas Turbine fueled by Natural gas and Bio gas to the impeller of a blower or a pump with heat recovery from the exhaust gas; all in one highly efficient system.

It is an aspect of this invention to provide a unit having a first inlet and first outlet; a second inlet and second outlet; an impeller disposed between said first inlet and said first outlet; a gas turbine disposed between said second inlet and said second outlet; a combustion mixture, introduced into said second inlet to drive said gas turbine and exhaust through said second outlet; an impeller disposed between said first inlet and said first outlet; and said gas turbine connected to said impeller so as to drive said impeller and move a fluid from said first inlet to said first outlet.

It is a further aspect or this invention to provide an integrated gas turbine unit comprising: a working fluid inlet and working fluid outlet; an impeller disposed between said working fluid inlet and said working fluid outlet; a combustor disposed between an inlet and outlet for combusting a mixture of air and biofuel to drive; a turbine; and a shaft having an axis rotation, said turbine and impeller coaxially connected to said shaft so as to move said working fluid.

Another aspect of this invention relates to method of driving an impeller with a gas turbine comprising: coaxially connecting said impeller and turbine; rotatably driving said turbine by combusting a mixture of air and fuel so as to rotationally drive said turbine and impeller and produce an exhaust gas; and capturing waste heat from said exhaust gas to preheat said air and move a working fluid by said impeller.

It is a further aspect of this invention to provide a method of driving an impeller with a gas turbine comprising: coaxially connecting said impeller and turbine; rotatably driving said gas turbine by combusting a mixture of air and fuel so as to rotationally drive said turbine and impeller and produce an exhaust gas; and capturing waste heat from said exhaust gas to preheat said air upon reentry to the gas turbine at a higher pressure ratio of 4.5 compared to inlet and at high temperature between 1800 and 2000 Deg. F, at which stage the gas expands through the gas turbine and results in further moving of a working fluid by said impeller. The gas expanding through the gas turbine enters the power turbine at high pressure and temperature, rotating the said power turbine that in turn rotates at variable the shaft directly connected to the impeller of the blower and pump to deliver the working air of fluid.

The higher pressure ration of 4.5 referred to above is as compared to atmosphere and is given by way of example. Moreover when considering the embodiment shown in FIGS. 14-19 herein pressure, ratios between 4.4 and 10 or higher (as compared to atmosphere) are exhibited and are given by way of example; this range is at least partially due to the change of configuration of utilizing three shafts 2, 3 and 17 and intercooler 31 described below. Furthermore the example of the temperature range of 1800 to 2000 Deg F. referred to above can be extended to 1700 to 2100 degrees or higher in the embodiment referred to in the embodiment of FIGS. 14-19.

Another aspect of this invention relates to a unit having: a first inlet and first outlet; a second inlet and second outlet; an impeller disposed between said first inlet and said first outlet; a compressor for elevating the pressure of air; a recuperator for increasing the temperature of said air at said elevated pressure; a gas turbine disposed between said second inlet and said second outlet; a combustor for receiving a combustion mixture comprising said air at said elevated temperature and said elevated pressure, and fuel introduced into said second inlet to drive said gas turbine and exhaust through said second outlet; the impeller disposed between said first inlet and said first outlet; and said gas turbine and said impeller directly connected to a shaft so as to drive said impeller and move a fluid from said first inlet to said first outlet. In one embodiment the gas turbine comprises a high pressure turbine and a free powered turbine and wherein said free powered turbine and said impeller are connected to a common shaft. In another embodiment the gas turbine comprises a high pressure turbine, a low pressure turbine, and free powered turbine and wherein said free powered turbine and said impeller are connected to a common shaft.

A further aspect of this invention relates to an integrated gas turbine unit comprising: a working fluid inlet and working fluid outlet; an impeller disposed between said working fluid inlet and said working fluid outlet; a first and second compressor for elevating the pressure of air; an intercooler disposed between said first and second compressor for reducing the temperature of said air before said second compressor; a recuperator for increasing the temperature of said air at said elevated pressure; a combustor disposed between an inlet and outlet for combusting a mixture of the air at said elevated pressure and elevated temperature and biofuel to drive a gas turbine with exhaust gases from said gas turbine; said recuperator recovering heat from said exhaust gases from said gas turbine to preheat said mixture of the air at said elevated pressure and temperature and biofuel, and a shaft having an axis of rotation, where a free powered turbine and impeller is connected to said shaft so as to move working fluid between said working fluid inlet and said working fluid outlet.

Yet another aspect of this invention relates to a method of driving an impeller with a gas turbine comprising: cooling air with an intercooler heat exchanger; compressing said cooled air in a compressor; coaxially connecting said impeller and a free powered turbine to a shaft; rotatably driving said gas turbine by combusting a mixture of said cooled compressed air and fuel so as to rotationally drive said gas turbine and impeller and produce an exhaust gas; and capturing waste heat from said exhaust gas with a recuperator to preheat said air.

These and other objects and features of the invention shall be described with the following drawings.

BRIEF DESCRIPTION OF THE DRAWINGS

The following detailed description will be better understood with reference to the accompany figures, wherein:

FIG. 3 is a front elevational view of the Gas Turbine unit 10.

FIG. 4. is a left side elevational view of the Gas Turbine Blower unit 10.

FIG. 13 is a chart illustrating one example of the efficiency and cost savings of this invention.

DETAILED DESCRIPTION OF SPECIFIC EMBODIMENTS

Figure 2:
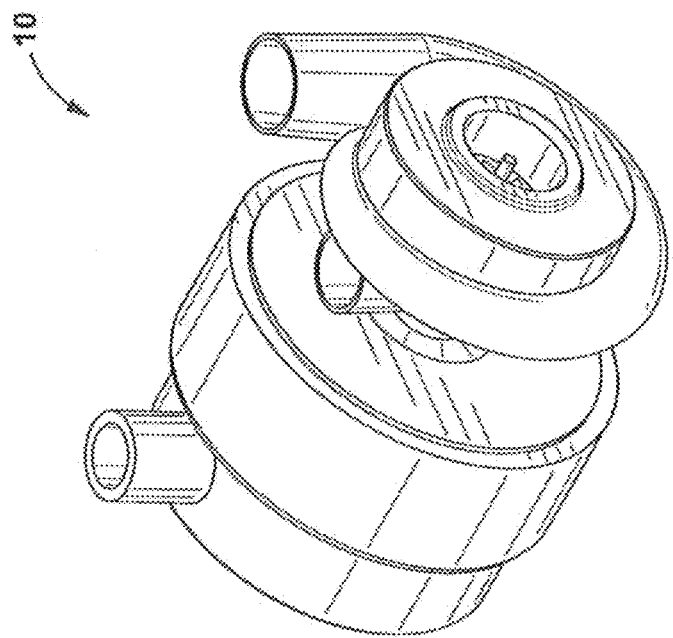
FIG. 2 is a perspective view taken from the rear right side view of the Gas Turbine unit 10.
Figure 1:
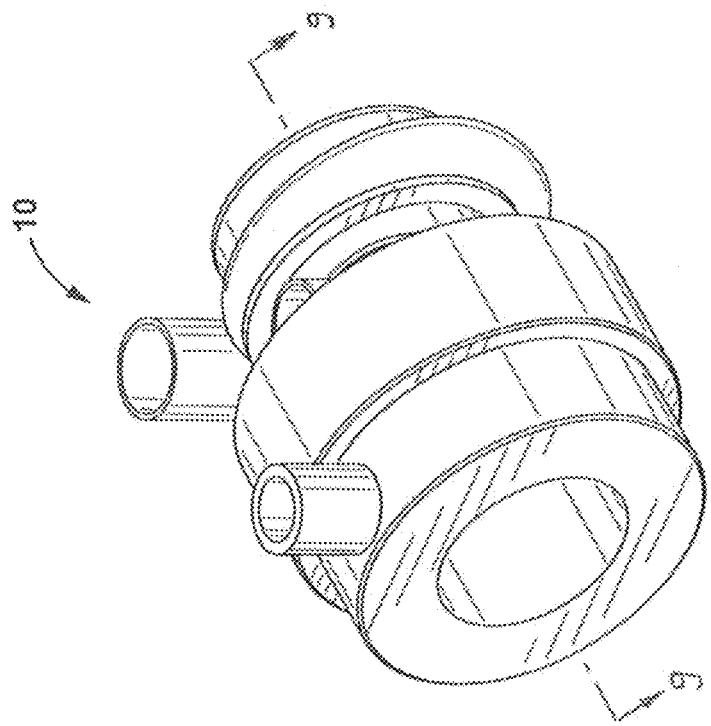
FIG. 1 is a perspective view taken from the right front side view of the Gas Turbine unit 10.
Figure 6:
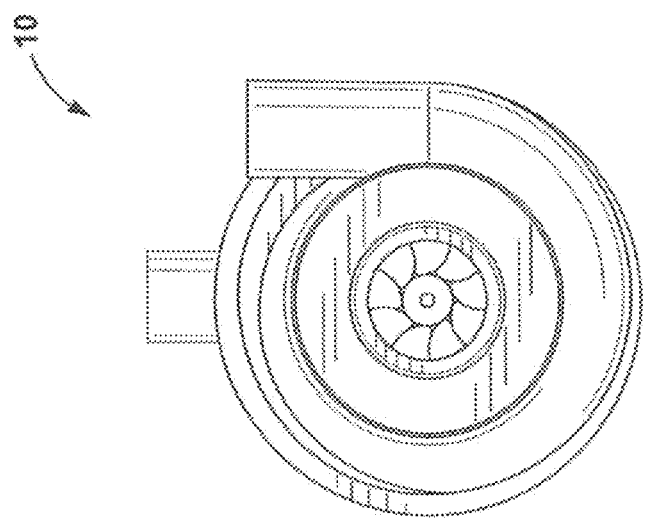
FIG. 6 is a rear elevational view of the Gas Turbine unit 10.
Figure 5:
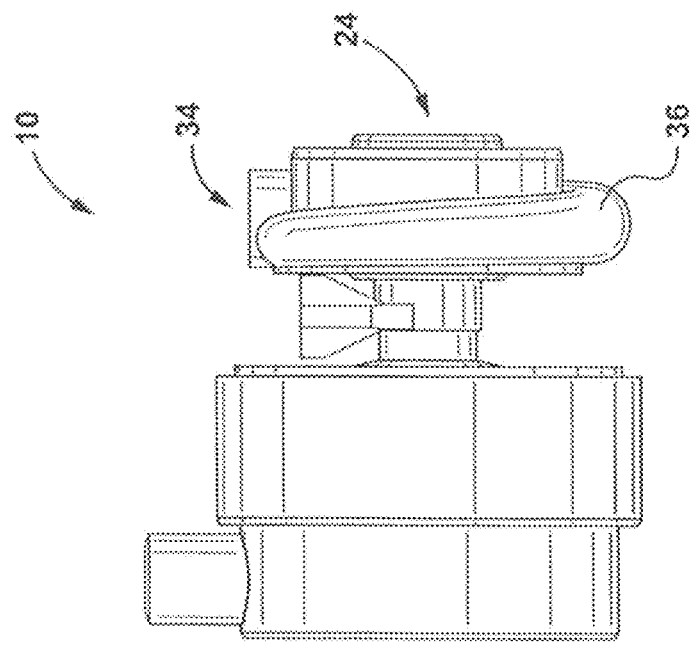
FIG. 5 is a right side elevational view of the Gas Turbine Blower unit 10.
Figure 8:
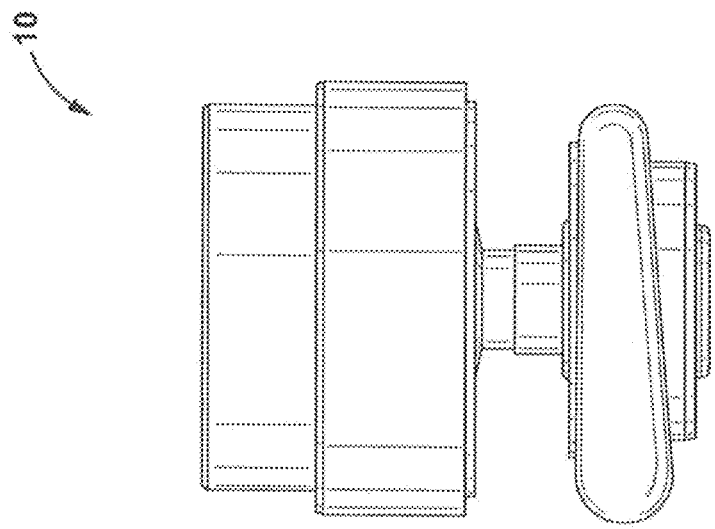
FIG. 8 is a bottom plan view of the Gas Turbine unit 10.

The same parts are marked throughout the figures with like numbers.

Two specific embodiments of the present invention will be described below. These embodiments are only exemplary of the present invention. It should be appreciated that in the development of any such actual implementation, as in engineering or design project, numerous detail decisions must be made to achieve the developer's specific goals which may vary from one embodiment to another.

The embodiments discussed below may include an optional gearbox 13 to reduce or increase rotor speed driven by free power turbine, an optional heat exchanger 27 and an optional electrical generator or cooling refrigerator 29 to recovery the wasted heat from the exhaust gas down stream from recuperator 60.

FIGS. 1 through 8 generally illustrate one embodiment of the invention renting to Gas Turbine unit or device 10 having a gas turbine module 12 combustion air inlet 14 blower or pump module 16, exhaust plenum 18, exhaust outlet 20 and inset 22. In one embodiment the inlet 22 is an air inlet or first inlet, or working fluid inlet 24 to a blower 26. In a second embodiment to be described herein the inlet 22 is a water inlet 28 to a pump 40 to be described herein.

The Gas Turbine device 10 also includes an outlet or first outlet or working fluid outlet 32.

In one embodiment the outlet first outlet or working fluid outlet 32 is an air outlet 34. More particularly air through the blower inlet 24 is compressed by a blower impeller 37 and then is discharged through the blower scroll or volute channel 36.

Figure 7:
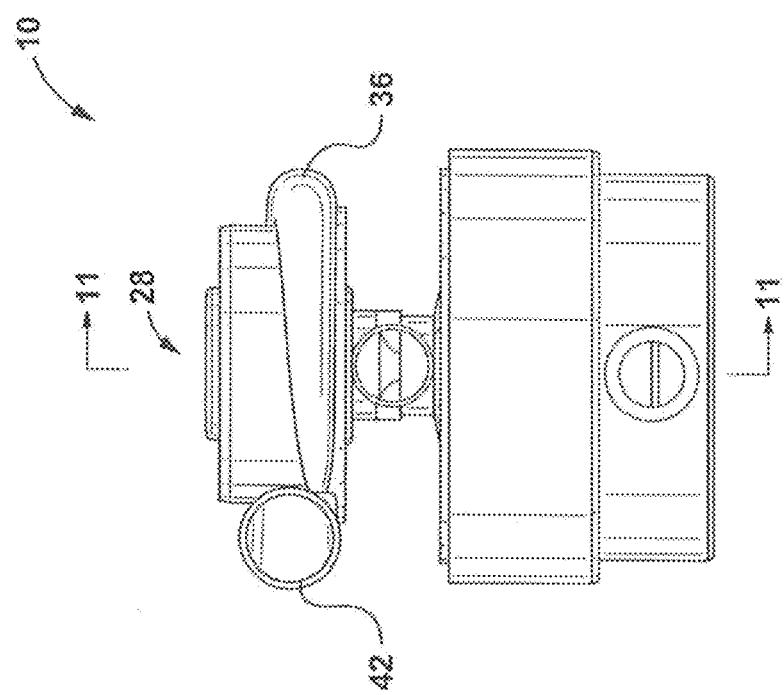
FIG. 7 is a top plan view of the Gas Turbine unit 10.

In another embodiment shown for example in FIG. 7 the Gas Turbine unit 10 includes a water inlet 28 a pump impeller 40 and water outlet 42.

Figure 9:
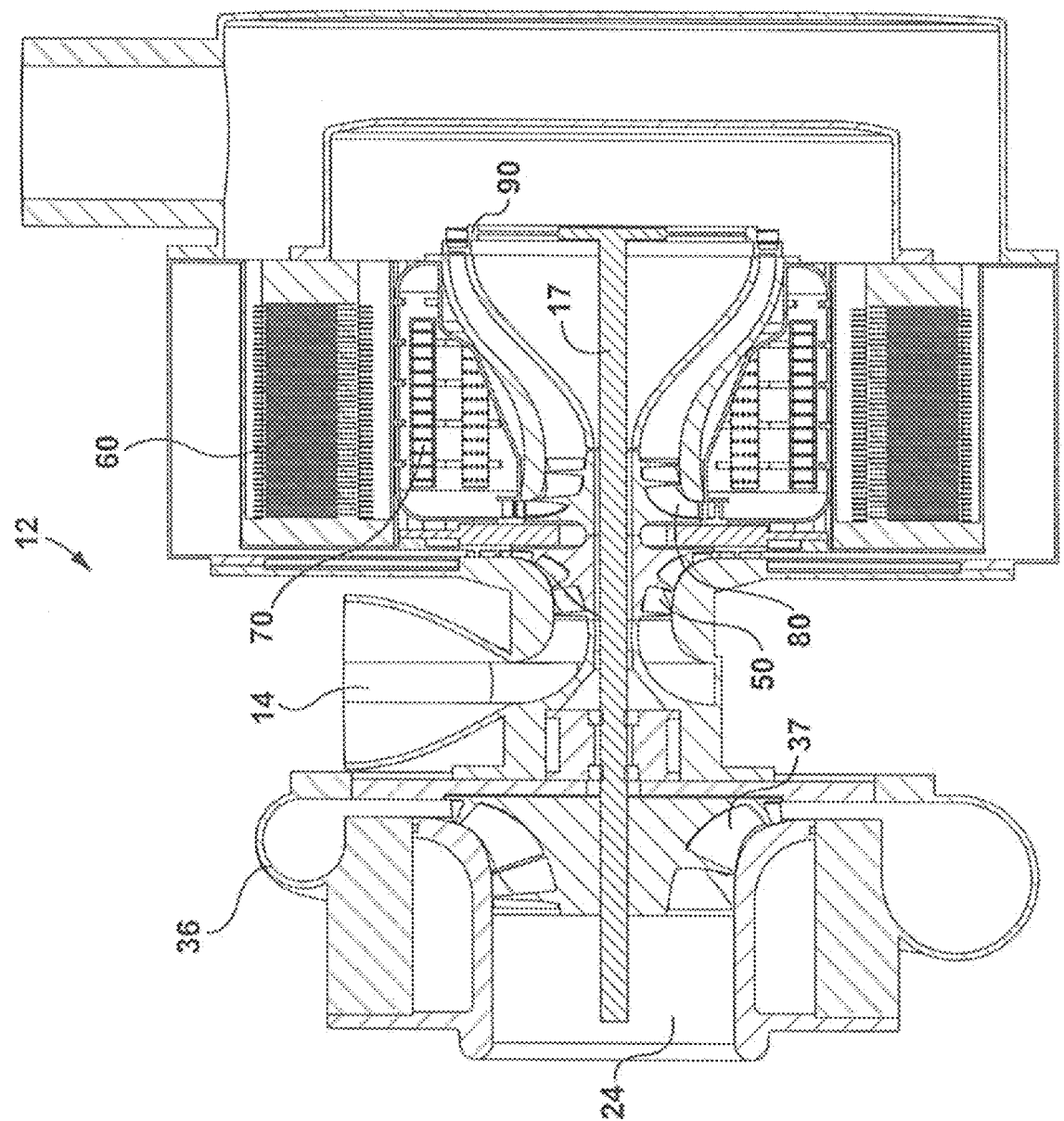
FIG. 9 is a cross sectional view of one embodiment of the invention relating to a Gas Turbine Blower unit 12 taken along lines 9-9 of FIG. 4 showing the rotors mounted in an arrangement with the main components.

The integration of the assembly as described herein not only produces an energy efficient blower/pump system 10 but also presents a unit 10 which is compact in size and design. In one embodiment the width of the unit as shown for example in FIG. 9 can be 39 inches and the height 37 inches. However such dimensions are given by way of example only as other compact sizes may be experienced depending on the size requirement to accomplish the rated flow ranging from 1,000 to 50,000 SCFM and discharge pressures from 0.5 to 1.2 atmospheres.

FIGS. 1, 2, 3, 4, 5, 6, 8, 9 and 10 illustrates one embodiment of a Gas Turbine Blower system 12 which generally includes a centrifugal blower impeller 37, a gas turbine axial and/or centrifugal compressor 50, a natural gas or biogas combustor 70, a high pressure axial and/or radial gas turbine 80, an axial and/or radial free power turbine 90 and a recuperator or heat exchanger 60.

On the blower side, the air through the blower inlet 24 is compressed by the blower impeller 37, and then ii is discharged after leaving the blower scroll 36 to outlet 34. The blower impeller 37 is driven by the free power turbine 90 through a common shaft or axis 17.

On the gas turbine side, the air passes through the inlet 14; is compressed by the compressor 50 to an elevated pressure over ambient pressure of for example 4-5 pressure ratio at which point it enters into the recuperator 80 which increases the air temperature. The heated air is burned with the fuel of natural gas/biogas in the combustor 70, and the high pressure and temperature gas is expanded in the high pressure gas turbine 80, and then the gas is expanded again in the free power turbine 90. Finally the gas is exhausted from the recuperator 60 which recovers heat to the air before combustor 70. The compressor 50 is driven by the high pressure gas turbine 80 through a common shaft or axis 2.

Figure 10:
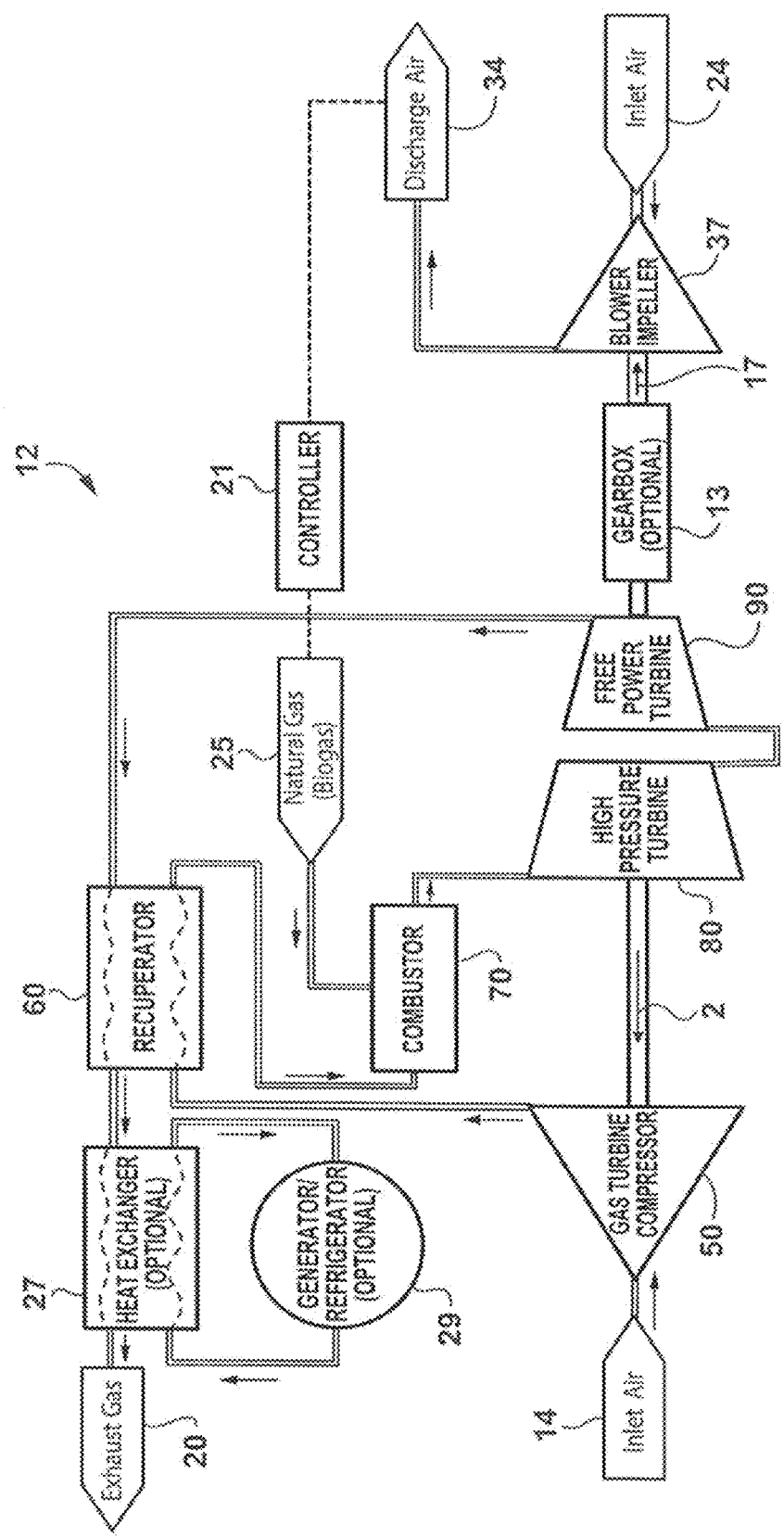
FIG. 10 is a schematic diagram of one embodiment of the Gas Turbine Blower unit, blower system shown in FIG. 9 with a gas turbine compressor driven by high-pressure gas turbine, a combustor of natural gas or biogas, a single blower impeller driven by a free power turbine and a recuperator recovering the heat from the exhaust gas that will be used to increase the gas turbine inlet temperature.
Figure 11:
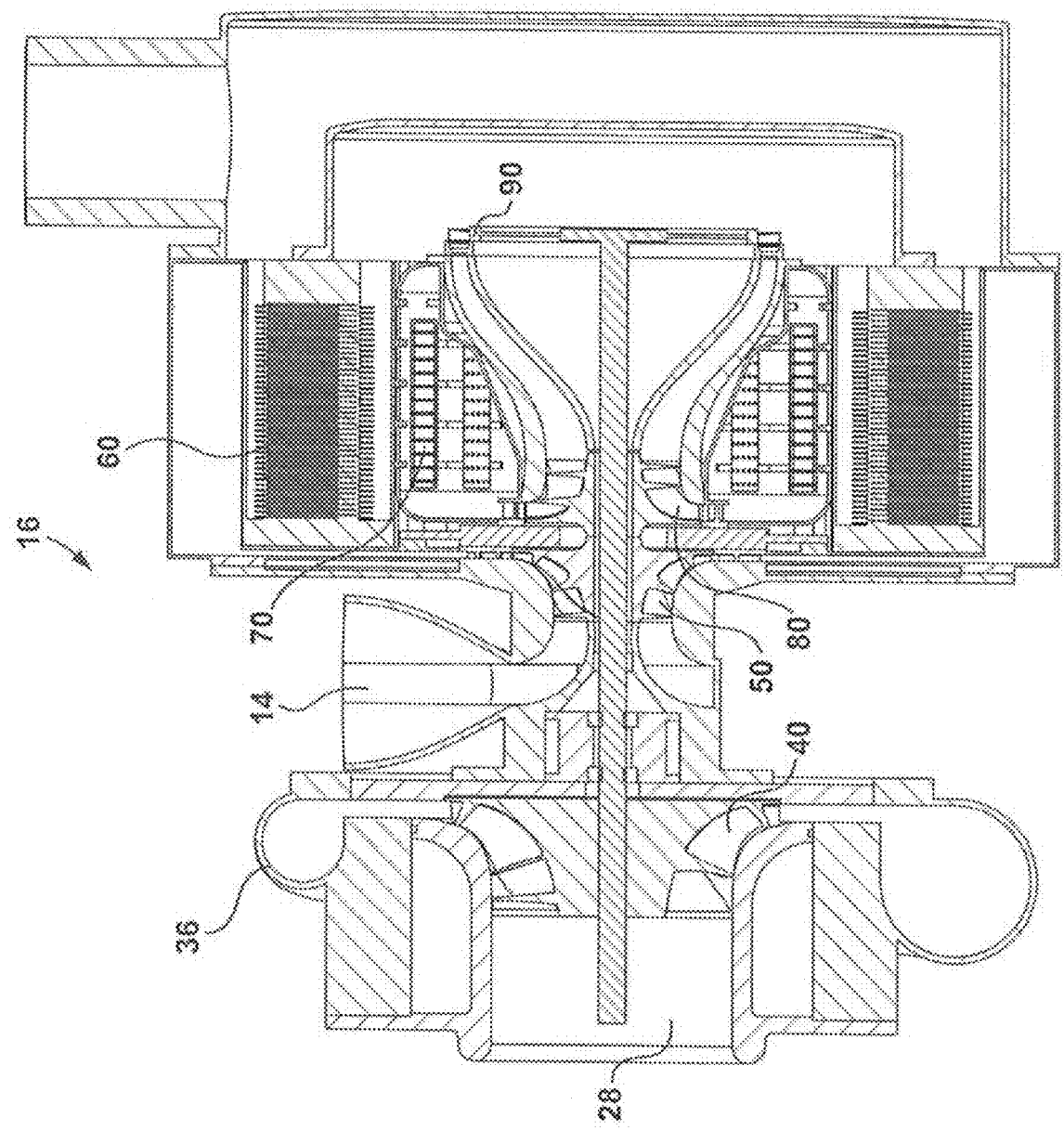
FIG. 11 is a cross sectional view of another embodiment of the invention relating to a Gas Turbine Pump unit 16 taken along lines 11-11 of FIG. 7.

FIG. 10 illustrates the one embodiment of a Gas Turbine Blower system 12 shown in FIGS. 1, 2, 3, 4, 5, 6, 8 and 9. The air flow inlet 24 of the blower 37 is in one example approximately 3000 to 15000 cubic feet per minute (CFM). The discharge air through outlet 34 in one example is 1.2-1.5 pressure ratio to a wastewater treatment system.

A free power turbine 90 provides the power to meet the requirement of working fluid. As shown in the drawing, the free turbine 90 is a single stage axial turbine, but it may be a single radial turbine or may have multiple stages of expansion.

A controller 21 such as a computer or the like is used to adjust the fuel of natural gas/biogas 25 and the air flow inlet 14 of the compressor 50 depending on the requirement of discharge air 34. In order to reduce or increase the speed of the blower impeller 37, an optional gearbox 13 can be installed on the shaft or the axis of rotation 17 between the blower 37 and free power turbine 90. In order to further increase energy efficiency, art optional heat exchanger 27 and an optional electrical generator or refrigerator system 29 can be installed at the exhaust of the recuperator 60.

FIGS. 1, 2, 3, 4, 6, 7, 8, 11 and 12 illustrates another embodiment of the invention in relation to a Gas Turbine Pump unit, device and system 16 which generally includes a pump impeller 40 a gas turbine axial and/or centrifugal compressor 50, a natural gas or biogas combustor 70, a high pressure axial and/for radial turbine 80, a axial and/or radial free power turbine 90 and a recuperator 60.

On the pump side, the water through the pump inlet 28 is compressed by the pump impeller 40, and then it is discharged alter leaving the pump scroll or volute passage 36 to outlet 42. The pump impeller 40 is driven by the free power turbine 90 through a common shaft or axis 17.

Figure 12:
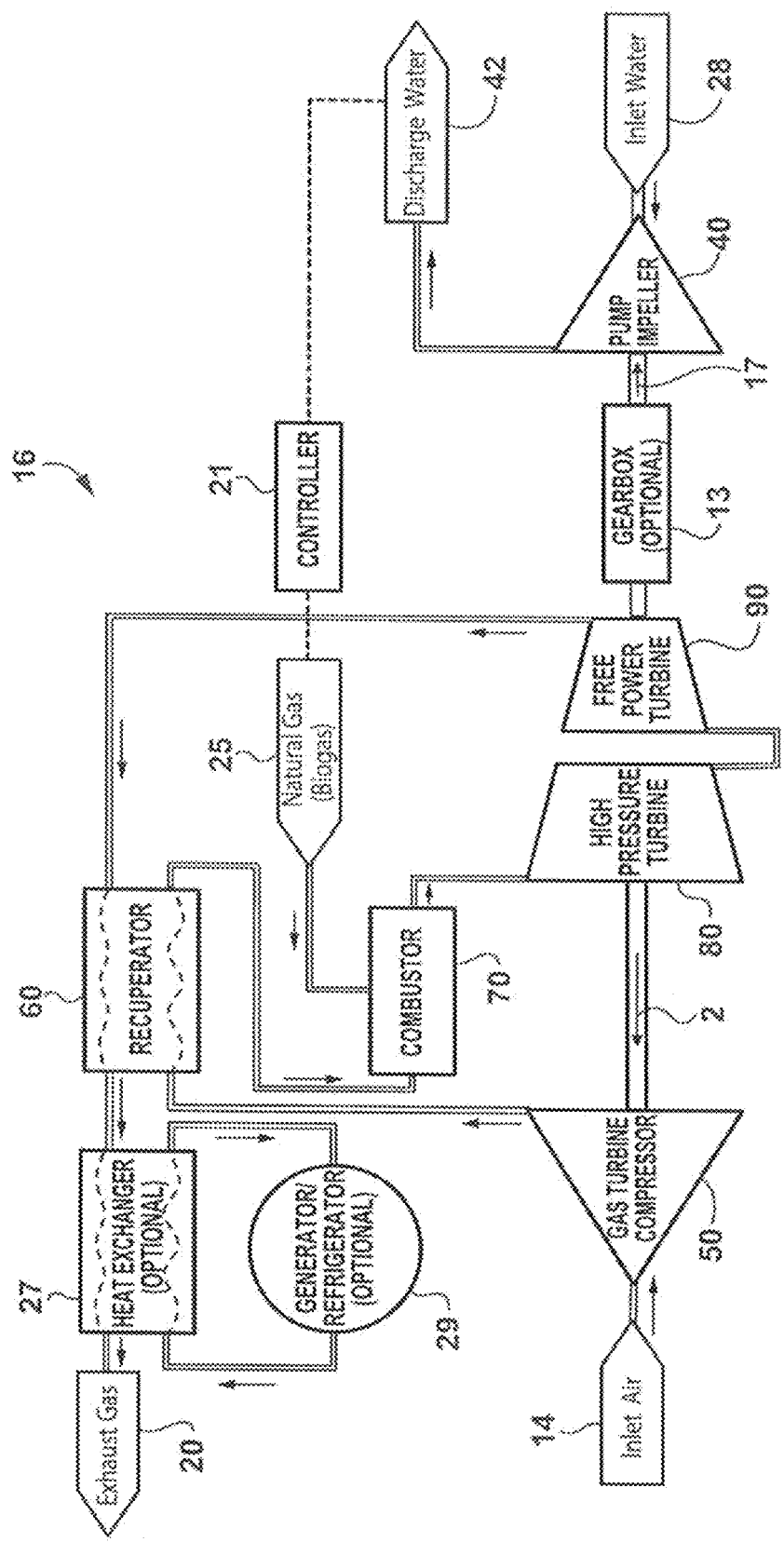
FIG. 12 is a schematic diagram of another embodiment of the Gas Turbine Pump unit, device, system shown in FIG. 11 with a gas turbine compressor driven by high pressure gas turbine, a combustor of natural gas or biogas, a single pump impeller driven by free power turbine and a recuperator recovering heat from the exhaust gas to be used to increase the gas turbine inlet temperature.

FIG. 12 illustrates the embodiment of the invention described in FIGS. 1, 2, 3, 4, 6, 7, 8, 11 relating to the Gas Turbine Pump unit, device and system 16 with other options on a block diagram. The water flow inlet 28 of the pump impeller 40, for example can be approximately 15,000 to 50,000 gallon per minute (GPM), the discharge water through outlet 42 is provided with varying pressure ratio to meet the requirements of a wastewater treatment system. The controller 21 is used to adjust the fuel of natural gas/biogas 25 and the air flow inlet 14 of the compressor 50 depending on the requirement of discharge water through outlet 42. In order to reduce or increase the speed of pump impeller 40, an optional gearbox 13 can be installed on the shaft or axis 17 between the pump 40 and free power turbine 90. In order to further increase energy efficiency, an optional heat exchanger 27 and an optional electrical generator or refrigerator system 29 can be installed at the exhaust of the recuperator 60.

Furthermore FIG. 13 is a chart which illustrates the efficiency and cost savings by utilizing the gas turbine system 10 as described herein versus a traditional electric motor option of traditional methods used before.

In particular FIG. 13 illustrates one example of the operating costs of the electric motor option in several states namely Florida, Texas and California versus the operating costs of the Gas Turbine system 10 as described herein for the same locations in Florida, Texas and California which showed a savings of 31% in costs in Florida, 40% savings in costs in Texas and 33% savings in costs in California, to run the systems with natural gas; based on the current cost of electricity and the historically high level cost of natural gas prices. The savings will be significantly higher when biogas is added to natural gas and more so if the system is operated with only biogas.

FIGS. 14-19 illustrate another embodiment of the invention where like parts are numbered with the same numbers as above.

Figure 14:
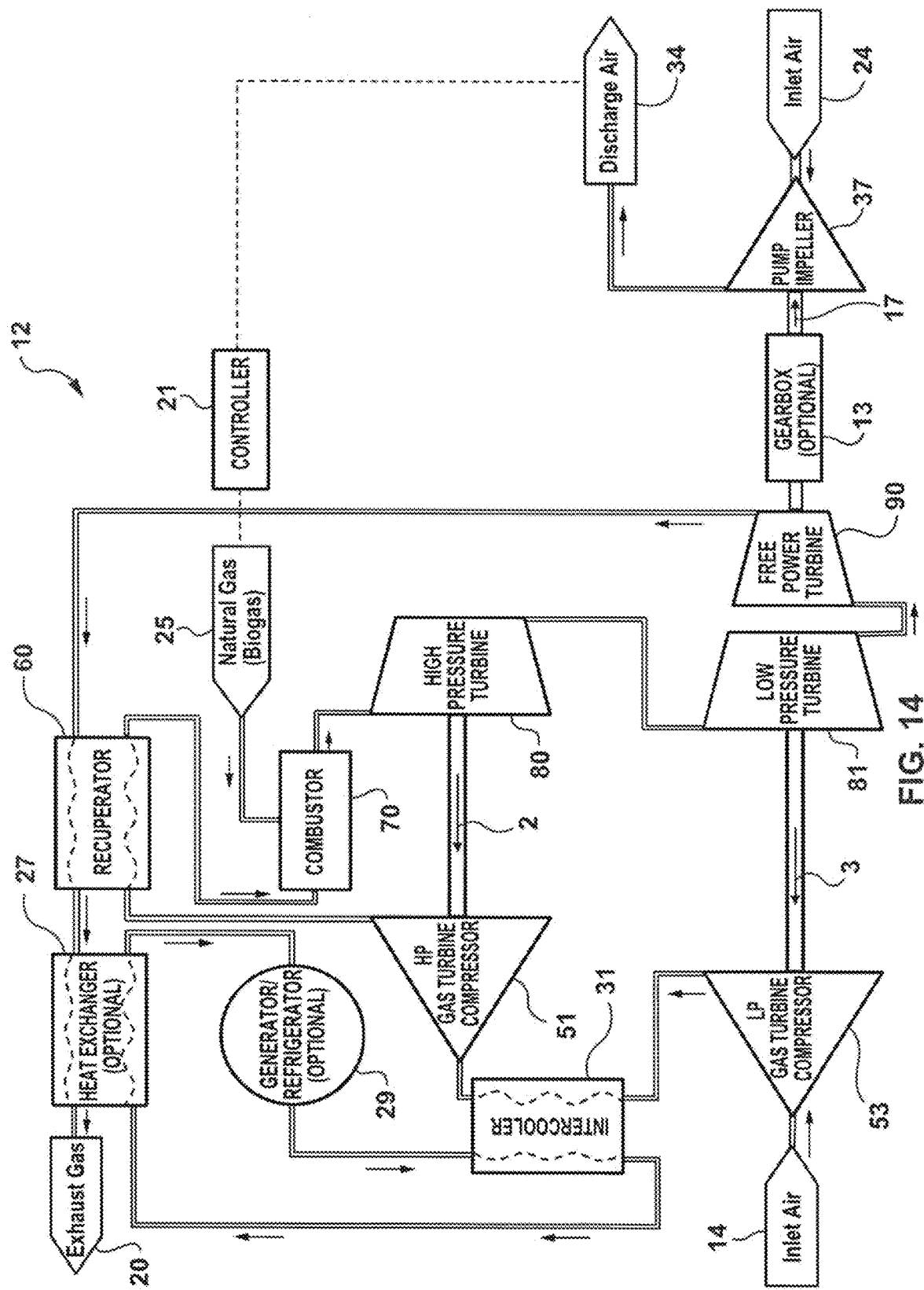
FIG. 14 is a schematic diagram of yet another embodiment of the Gas Turbine Blower unit, with a high gas turbine compressor driven by high-pressure gas turbine, a combustor of natural gas or biogas, a single blower impeller driven by a free power turbine a recuperator recovering the heat from the exhaust gas that will be used to increase the gas turbine inlet temperature and an intercooler before the high pressure gas turbine compressor.
Figure 15:
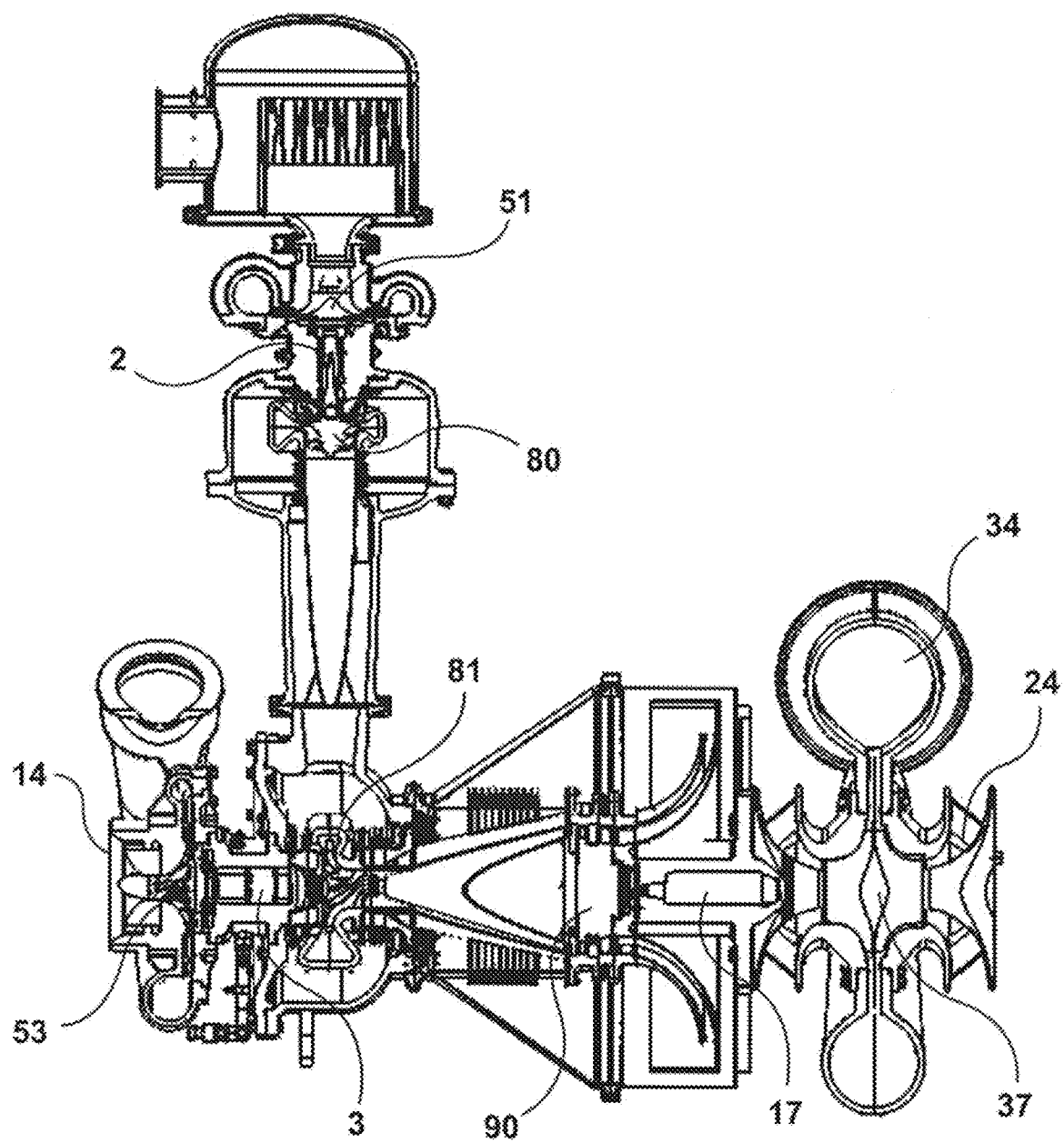
FIG. 15 is a cross sectional view of the embodiment shown in schematic diagram FIG. 14.
Figure 16:
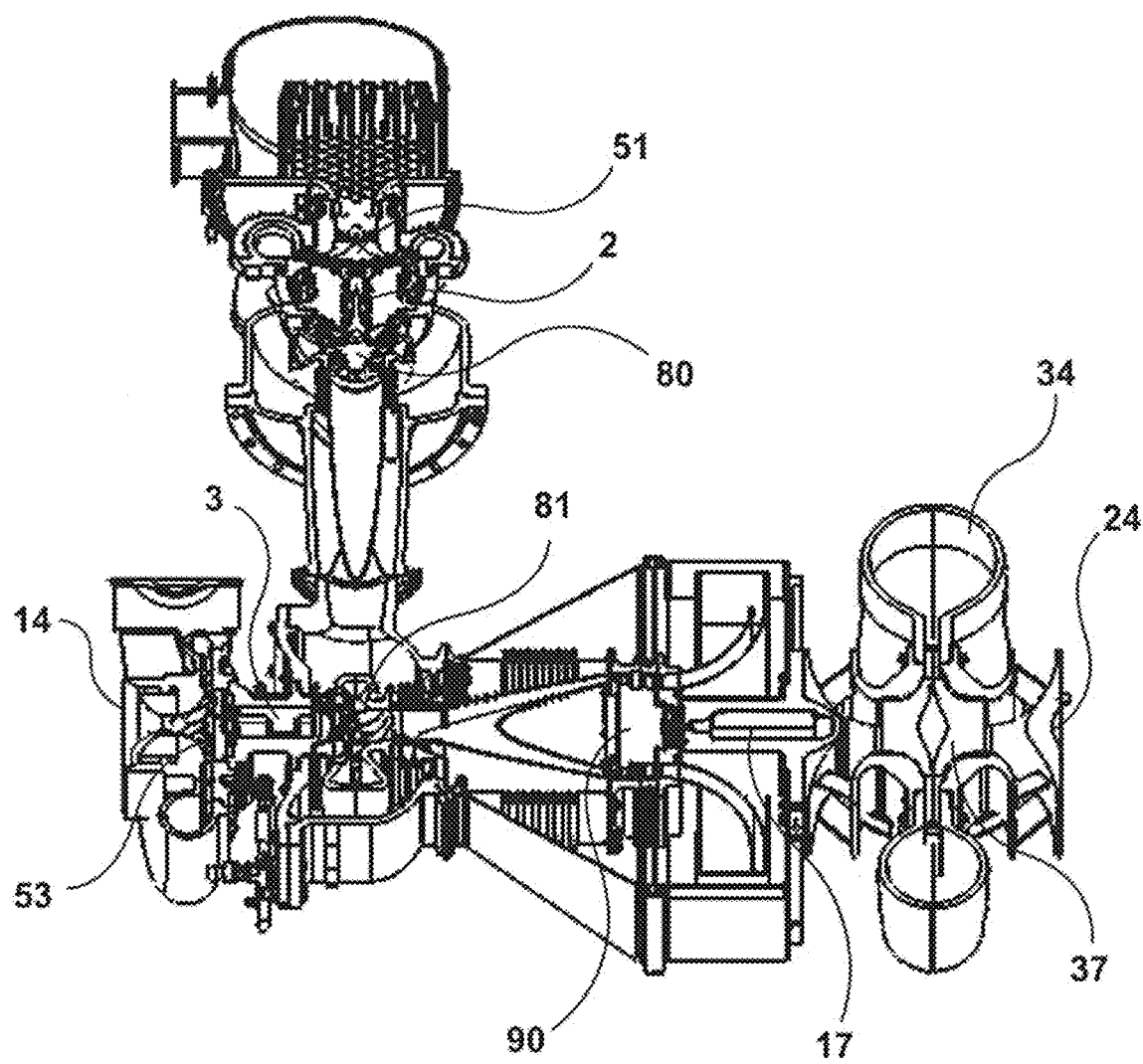
FIG. 16 is a perspective cross sectional view of FIG. 15.
Figure 17:
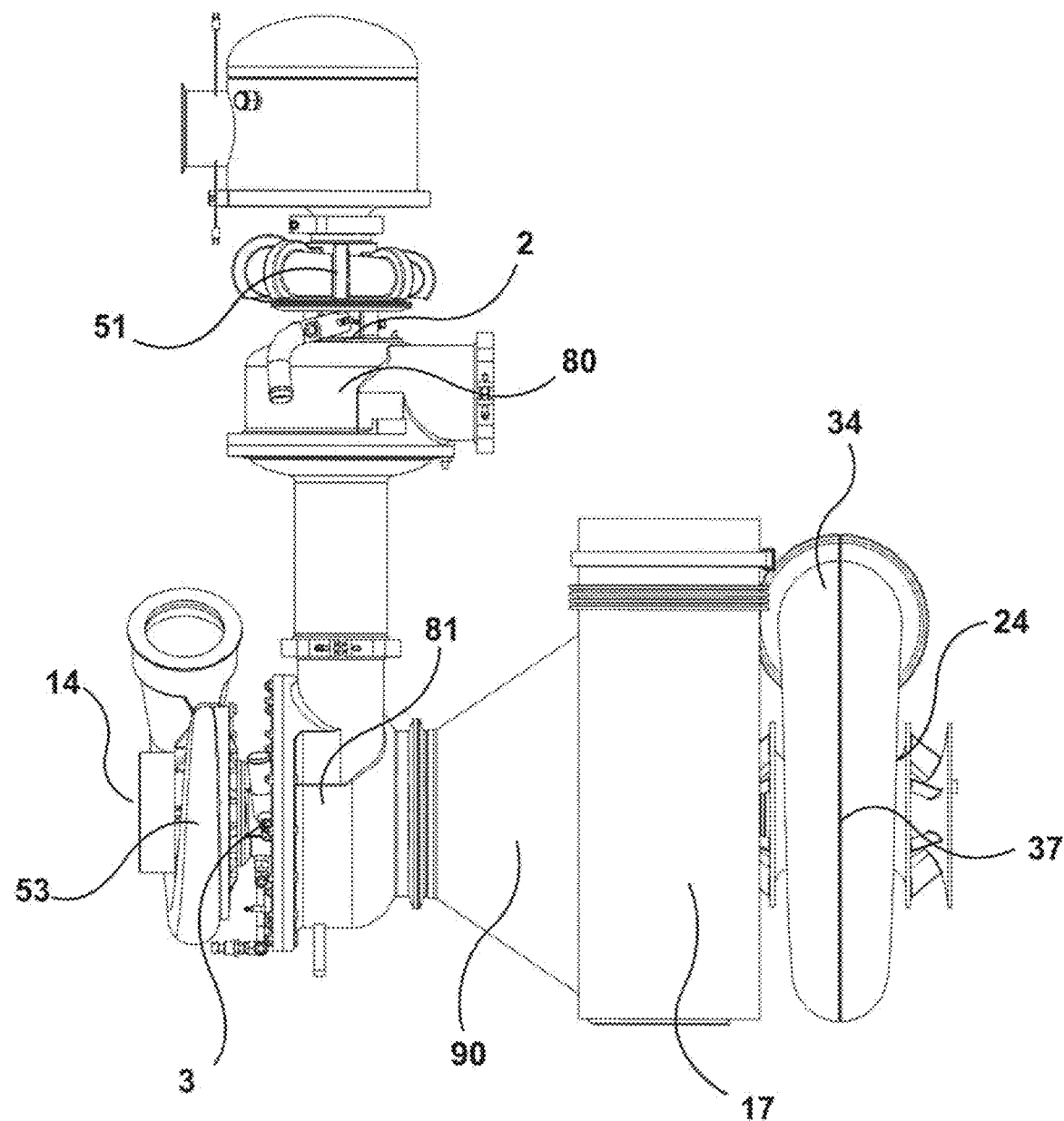
FIG. 17 is a front elevation view of FIG. 15
Figure 18:
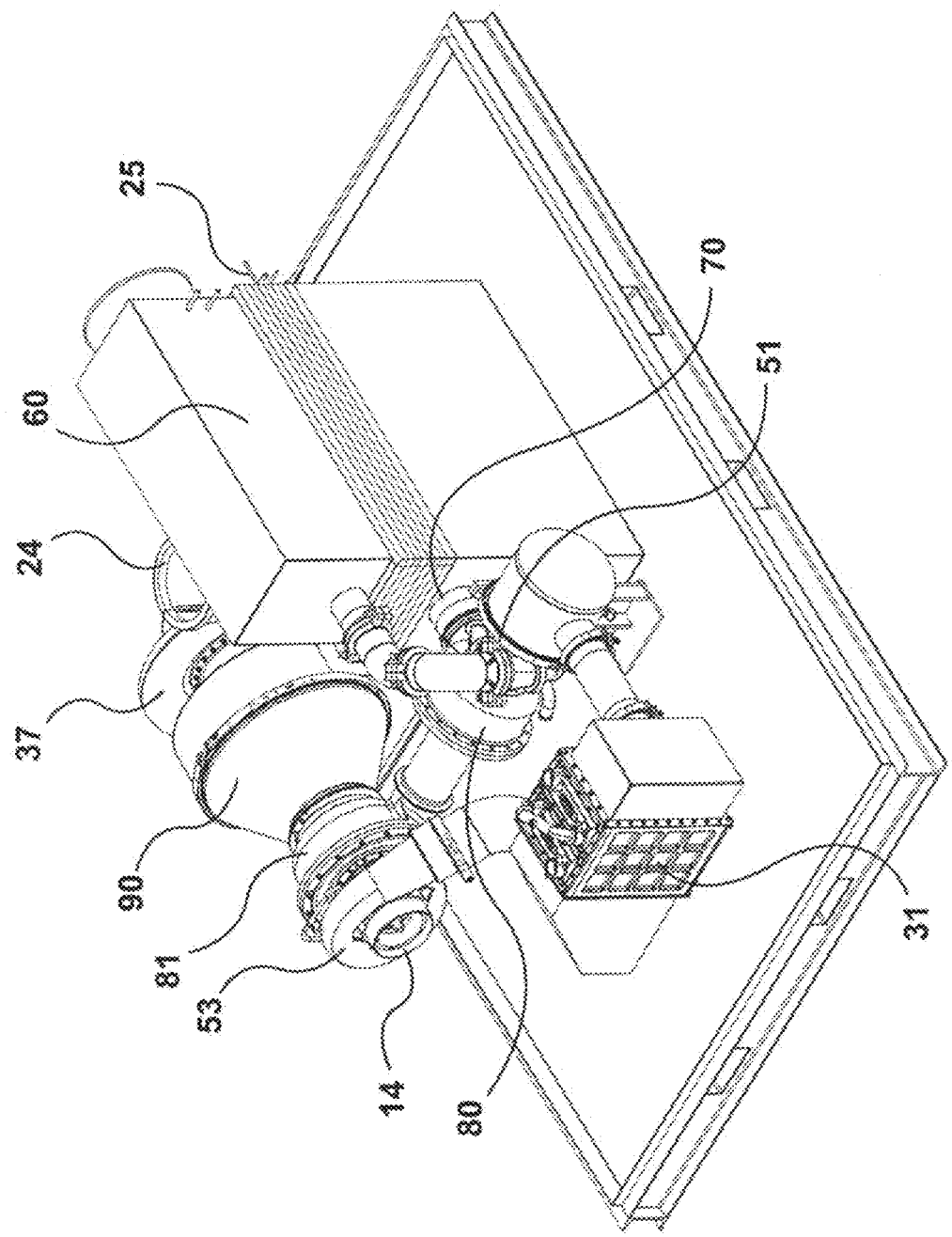
FIG. 18 is a perspective view of the yet another embodiment shown in FIGS. 14-17 taken from above and from one side of the unit.
Figure 19:
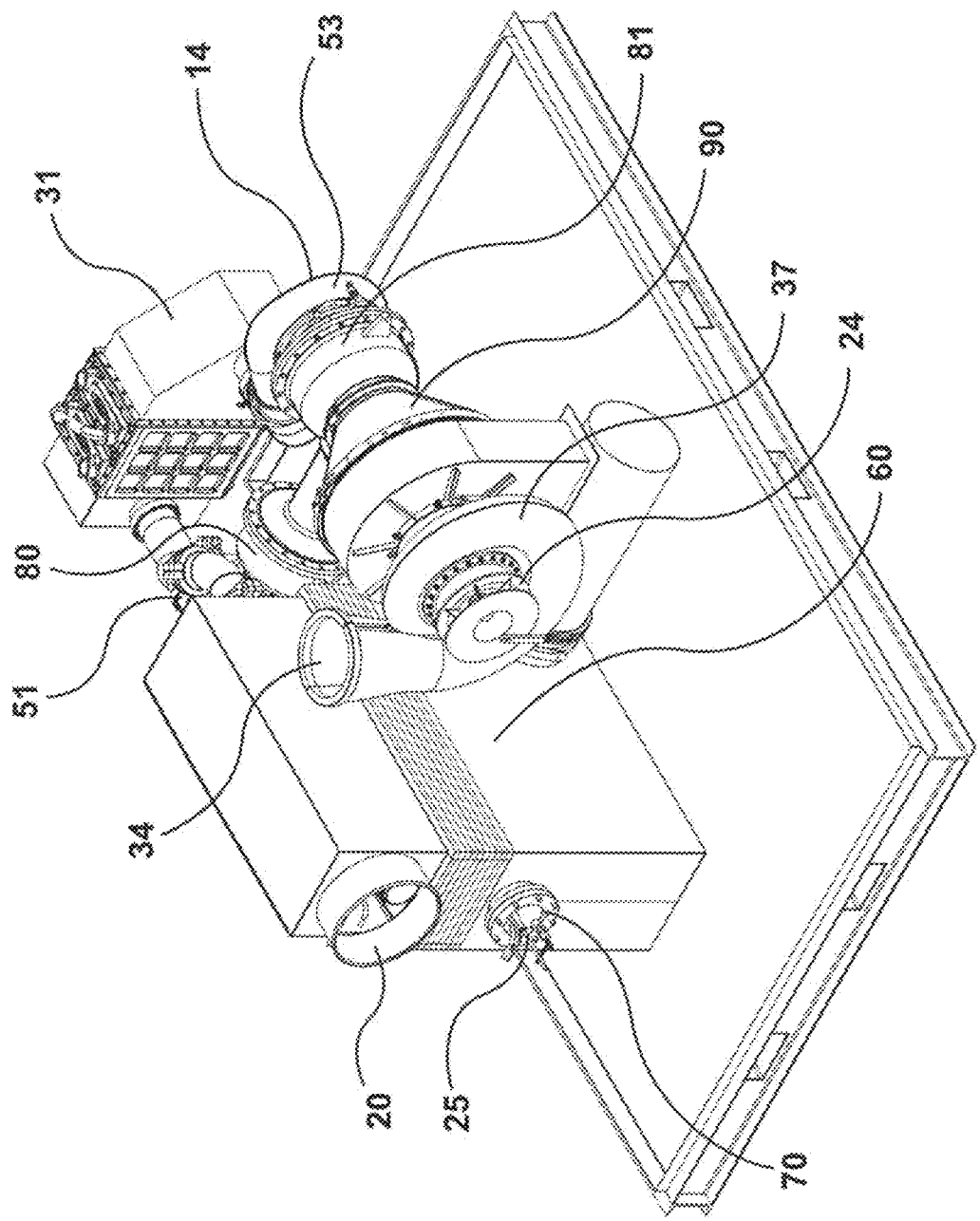
FIG. 19 is a perspective view of the yet another embodiment shown in FIGS. 14-17 taken from above and from one side of the unit.

FIG. 14 in addition to the components described above, shows a high pressure gas turbine compressor 51, which is connected on a common shaft 2 with a high pressure turbine 80. The embodiment shown in FIG. 14 also includes a low pressure gas turbine compressor 53, which is connected on a common shaft 3 to low pressure turbine 81. The free power turbine 90 is connected to low blower impeller 37 by shaft 17. Furthermore, the embodiment shown in FIG. 14 includes an intercooler 31 disposed between the low pressure gas turbine compressor 53 and high pressure gas turbine compressor 51.

Cooling of the inlet air 14 occurs between the two compressor stages 51 and 53 by intercooler 31. This improves the efficiency of the unit since cooled air 14 at the high pressure turbine compressor 51 will be easier to compress than heated air. After the high pressured gas turbine compressor 51 the air is then heated by recuperator or heat exchanger 60 prior to the air entering the combustor 70, thus again improving efficiently as less heat input will be required to combust the air and natural gas (biogas) mixture, if the air is at a higher temperature.

Furthermore, the embodiment shown in FIGS. 14-19 illustrate the optimization of the power turbine with the double inlet design as shown. The design as shown also illustrates flow partitioning optimization as well as cooling flow first past optimization.

Moreover, the turbines as shown are suitable candidates for additive manufacturing (3D printing) for efficient manufacturing.

The embodiment shewn in FIGS. 14-19 illustrate a high efficiency inter-cooled and recuperated gas turbine driven turbo blower delivering air at high volume with intercooler, recuperator and CMHP (for example for ranges of 230 KW 1.2 MW).

The unit is operable by biogas (which is byproduct WWTP) and/natural gas instead of electricity or fossil fuels, which has lower emissions, reducing operating costs of up to 80% with biogas and 40% with natural gas. The unit shown can also be used to retrofit old and existing technologies.

Other advantages of the invention include:
  The system cars replace conventional electrical blowers; as the units are powered by a gas-turbine engine instead an electric motor, reducing dependence on an electrical grid.
  Reducing energy consumption.
  The use of a fuel-flexible clean combustor allowing the burning of biogas with low-pollutant emissions, providing clean power and preventing flaring on WWTP's.
  Reducing operating costs.

By Way of Example

In one embodiment the low pressure compressor 53 has a pressure ratio of around 3 compared to atmosphere, and a temperature rise of around 125K (235 F) with respect to inlet temperature (293K).

The intercooler 31 reduces the temperature of ~418 K (125+293) back to inlet temperature (293K). The high pressure compressor 51 can have a pressure ratio of around 3, and a temperature rise of around 125K (235 F) with respect to inlet temperature. The total pressure ratio (PR) of the gas turbine unit described (PR=9), is equal to the PR of the low pressure compressor 53 times PR of high pressure compressor 51; namely PR=3×3=9. The pressure rise is distributed almost evenly between the 2 compressor stages.

For the 3 turbines described in FIGS. 14-19, a similar logic applies. The Pressure ratios are distributed close to evenly between the turbine stages. PR single stage=2.08, and PR machine=2.08×2.08×2.08.

The low pressure gas turbine compressor 53 draws air from atmosphere and delivers air at for example 3 times atmosphere. The high pressure gas turbine compressor 51 delivers air at for example from 3 times atmosphere to 9 times atmosphere.

The term free power turbine 90 is a term well known to those persons skilled in the art and generally refers to providing power to the blower impeller.

The invention claimed is:

1. A unit having:
    (a) a working fluid inlet and a working fluid outlet;
    (b) an air inlet and an exhaust outlet;
    (c) an impeller disposed between said working fluid inlet and said working fluid outlet;
    (d) first and second compressor stages for elevating the pressure of air; wherein the first compressor stage is driven by a low pressure turbine through a first common shaft, and the second compressor stage is driven by a high pressure turbine through a second common shaft;
    (e) a recuperator for increasing the temperature of said air at said elevated pressure;
    (f) a gas turbine disposed between said air inlet and said exhaust outlet, where the gas turbine comprises the low pressure turbine, the high pressure turbine and a free power turbine;
    (g) a combustor for receiving a combustion mixture comprising said air at said elevated temperature and said elevated pressure, and fuel to drive said gas turbine and exhaust through said exhaust outlet;
    (h) said free power turbine driven by exhaust gases from said low pressure turbine;
    (i) said recuperator recovering heat from exhaust gases from said free power turbine to preheat said combustion mixture;
    (j) said gas free power turbine and said impeller connected to a third common shaft so as to drive said impeller and move said working fluid from said fluid inlet to said fluid outlet.

2. The unit as claimed in claim 1 wherein said impeller is an air blower when said working fluid is air.

3. The unit as claimed in claim 1 wherein said impeller is a pump when said working fluid is water.

4. The unit as claimed in claim 1 including an intercooler disposed between said first and second compressor stages to cool said air between said first and second compressor stages.

5. The unit as claimed in claim 4 wherein said fuel is selected from a group of natural gas and biogas.

6. The unit as claimed in claim 5 including a gearbox disposed between said impeller and said free power turbine.

7. The unit as claimed in claim 6 including a heat exchanger.

8. The unit as claimed in claim 7 including an electric generator or refrigerator.

9. An integrated gas turbine unit comprising:
    (a) a working fluid inlet and working fluid outlet;
    (b) an air inlet and an exhaust outlet;
    (c) an impeller disposed between said working fluid inlet and said working fluid outlet;
    (d) a first and second compressor for elevating the pressure of air; wherein the first compressor is driven by a first pressure turbine through a first common shaft, and the second compressor driven by a second pressure turbine through a second common shaft;
    (e) an intercooler disposed between said first and second compressor for reducing the temperature of said air before second compressor;
    (f) a recuperator for increasing the temperature of said air at said elevated pressure;
    (g) a gas turbine disposed between said air inlet and said exhaust outlet, where the gas turbine comprises the first pressure turbine, the second pressure turbine and a free power turbine;
    (h) a combustor for receiving a combustion mixture of the air at said elevated pressure and elevated temperature and fuel to drive said gas turbine and exhaust through said exhaust outlet;
    (i) said first pressure turbine communicating with said second pressure turbine;
    (j) said recuperator recovering heat from said exhaust gases from said free power turbine to preheat said mixture of the air at said elevated pressure and temperature; and
    (k) said free powered turbine and said impeller connected to a third common shaft so as to drive said impeller and move said working fluid from said working fluid inlet to said working fluid outlet.

10. The integrated gas turbine unit as claimed in claim 9 wherein said first compressor comprises a low pressure compressor and said second compressor comprises a high pressure compressor.

11. The integrated gas turbine unit as claimed in claim 10 including a heat exchanger communicating with said recuperator and intercooler.

12. The integrated gas turbine as claimed in claim 11 further including a refrigerator disposed between said intercooler and heat exchanger.

13. The integrated gas turbine as claimed in claim 12 further including a gearbox disposed between said free power turbine and said impellor.

14. A method of driving an impeller with a free power turbine comprising: coaxially connecting said impeller and said free power turbine along a shaft; elevating the pressure of air in a first compressor connected to a first pressure turbine through a first common shaft and then elevating the pressure of said air through a second compressor driven by a second pressure turbine connected through a second common shaft; rotatably driving said free power turbine by combusting a mixture of air and fuel so as to rotationally drive the first pressure turbine and said second pressure turbine and directing the exhaust from said first pressure turbine and said second pressure turbine to said free power turbine so as to rotationally drive said free power turbine and impeller along said shaft; capturing waste heat from said free power turbine with a recuperator to preheat said air and positioning said impellor between a working fluid inlet and working fluid outlet.

15. The method of claim 14 comprising:
(a) cooling the air with an intercooler heat exchanger disposed between the first compressor and the second compressor.

16. The method of claim 15 wherein said impeller is a blower when said fluid is air.

17. The method of claim 15 wherein the impellor is a pump when said fluid is water.

18. The method of claim 15 wherein said fuel is selected from the group of natural gas and bio fuel.

19. The method as claimed in claim 15 wherein the first pressure turbine is a low pressure turbine and the second pressure turbine is a high pressure turbine.

\* \* \* \* \*